Nov. 9, 1965   A. N. DURFEE   3,216,379
BRIQUETTE IGNITER
Filed July 22, 1963

INVENTOR.
ARDEN N. DURFEE
BY
ATTORNEY

United States Patent Office 3,216,379
Patented Nov. 9, 1965

3,216,379
BRIQUETTE IGNITER
Arden N. Durfee, 6633 S. Datura, Littleton, Colo.
Filed July 22, 1963, Ser. No. 296,681
5 Claims. (Cl. 110—1)

This invention relates to devices and processes for igniting fuel and more particularly to an igniter for briquetted fuels of the type utilized in portable grills.

Briquetted fuels are presently generally ignited by pouring a liquid hydrocarbon on the fuels and igniting the hydrocarbon. This procedure is dangerous and also causes food cooked over the burining briquettes to taste of hydrocarbon.

Igniters for briquettes are known. For example, United States Patent 2,920,614 teaches an igniter which is essentially a little stove which is to be placed on a portable grill. Paper placed on the grill is used to ignite the briquettes placed within the stove. The briquettes are then dumped into the grill by removing a grate on which the briquettes rest.

This prior device is effective for the desired purpose but is designed to be more of a stove than an igniter. Furthermore, adjustment of the parts of this prior art for various uses is required.

I have now invented a highly efficient igniter which can be manufactured economically in several forms. The igniter is safe and, on completion of ignition, disburses the ignited briquettes placed in the grill. Additional briquettes can be added if very long burning is required.

The attached drawing illustrates a form my invention can take and the method of its use.

Figure 1:
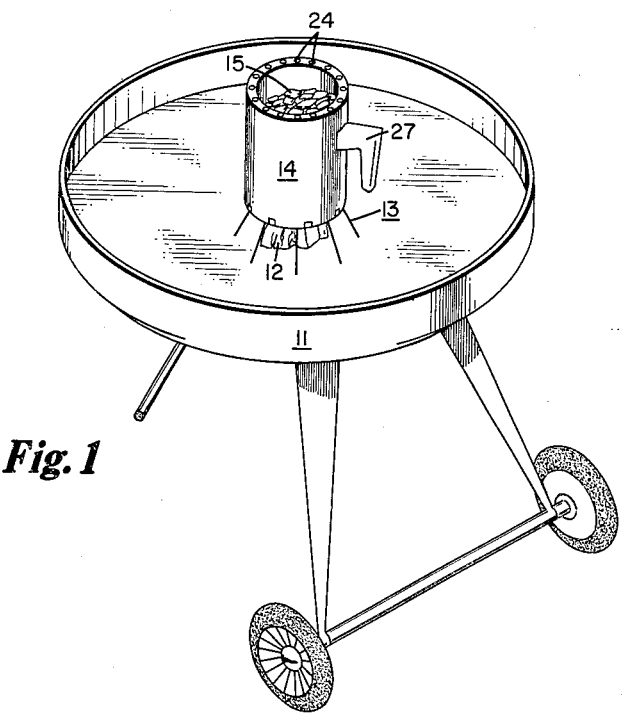
FIGURE 1 depicts one embodiment of the invention positioned for use in the usual portable charcoal grill used in many American back yards.

More particularly, FIG. 1 depicts a portable brazier 11 with the grill removed. The device of this invention is placed in brazier 11 and an empty milk carton 12 is placed beneath wire cone 13 which constitutes an openwork support means including a grate portion internal to chimney 14. Chimney 14 rests on said support means intermediate the top and bottom thereon. Briquettes 15 are placed within chimney 14 on said grate portion. Wire cone 13 and chimney 14 are preferably of a size such that all the briquettes to be utilized to cook a meal can be ignited at once.

The burning of one discarded wax or plastic-type milk carton is usually sufficient to ignite a charge of charcoal briquettes in the igniter. After about 15 minutes, all the briquettes in the igniter are burning and the briquettes can be dumped into the brazier. Any solid combustibles can be used for ignition purpose. The use of my invention reduces the cost of the individual ignition, as only discarded combustibles are utilized.

It appears that the hollowed briquette charge ignites more readily than does a charge which is not hollowed on its underside. This may result from the fact that chimney 14 provides optimum updraft through briquettes 15 and the hollow within the mass of briquettes 15 provides a direct contact between the flames and a larger number of briquettes.

Figure 2:
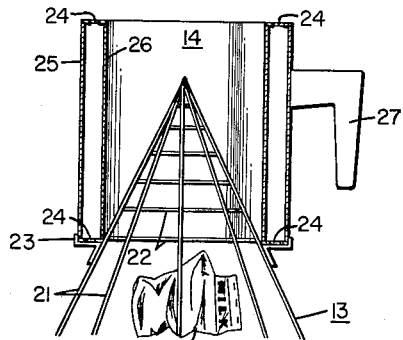
FIGURE 2 is a cross-sectional view of the igniter depicted in the grill of FIG. 1.

FIGURE 2 utilizes the same numbers as FIG. 1. In FIG. 2, cone 13 is made up of a plurality of heat-resistant rigid wires 21 of equal length leading downwardly and outwardly from the apex of the cone. Rings 22 are welded to wires 21 and serve to maintain the integrity of the cone and to prevent the briquettes from falling from the igniter. Cone 13 is provided with retainers 23 which level chimney 14.

Chimney 14 is double walled. Perforations 24 in the ends of chimney 14 allow a flow of air between the double walls 25 and 26 of chimney 14. Wall 25 remains safely cool in the usual briquette ignition because of the flow of air between the walls 25 and 26 of chimney 14. Handle 27 is affixed to chimney 14 to facilitate positioning chimney 14 on cone 13 and for the unloading of the ignited briquettes.

It is preferable to affix the handle to the lower portion of the chimney as the chimney is cooler at its lower edge after ignition of a charge of briquettes. Flutes, not shown, in the sides of the chimney allow flames to pass up the flutes and aid in igniting the briquettes.

While the above-described embodiment is preferred, other embodiments will be obvious to those skilled in the art. Such embodiments are intended to be included within the scope of my invention as claimed. Thus, positioning retainers 23 can be omitted or a plurality of wires 21 and 24 can be bent to form knees on which a chimney can rest. Alternately, the chimney can be made of a metal sheet having curved or square corrugations.

Where a corrugated inner wall is utilized, it can be set apart from a noncorrugated outer wall by spacers to provide a double-walled chimney.

Now having described my invention, what I claim is:

1. An igniter for a charge of sized, particulate solids, wherein said charge is exposed to a flame until ignited; comprising a substantially cylindrical chimney and a conical openwork support means including a substantially conical grate adapted to support said chimney intermediate the top and bottom of said support means and to support, on substantially the entire upper surface of said grate within the chimney, said charge.

2. The igniter if claim 1 wherein the chimney is double walled and adapted for the circulation of air between said walls.

3. The igniter of claim 1 wherein the chimney has a handle affixed thereto.

4. A charcoal briquette igniter, wherein a charge of briquettes is exposed to heat until ignited, comprising a chimney and a support means including a grate portion:

(1) said support means being openwork throughout, having a grate forming raised portion internal to the chimney when said chimney is supported on said support means, and adapted to
   (a) support said chimney intermediate the top and bottom thereof,
   (b) support a charge of briquettes on substantially the entire upper surface of said grate portion within said chimney and above a heat source placed under said grate portion, and
   (c) hollow the under surface of a charge of briquettes placed on said grate portion;

(2) said chimney being adapted to
   (a) rest on said support means intermediate the top and bottom thereof;
and said grate portion and said chimney being adapted to deposit a charge of ignited briquettes in a brazier when said briquettes are ignited by moving said chimney from a position on said support means.

5. An igniter for particulate solids wherein a charge of particulate solids are exposed to a heat source beneath said igniter until ignited, comprising a chimney and an openwork support means, said support means including a grate having passages for heat substantially throughout, having a raised portion effective to impart a hollowed undersurface to a charge of particulate solids and adapted to support said chimney intermediate the top and bottom of said support means.

References Cited by the Examiner

UNITED STATES PATENTS

| 1,622,431 | 3/27 | Feigenbaum | 110—18 |
| 2,920,614 | 1/60 | Phelps | 126—25 X |
| 3,062,200 | 11/62 | Miller | 126—25 |

FOREIGN PATENTS

| 629,227 | 11/27 | France. |
| 11,178 | 1910 | Great Britain. |
| 17,067 | 1910 | Great Britain. |
| 246,549 | 1/26 | Great Britain. |
| 361,150 | 11/31 | Great Britain. |
| 382,712 | 11/32 | Great Britain. |

FREDERICK L. MATTESON, Jr., *Primary Examiner.*
JAMES W. WESTHAVER, ROBERT A. DUA,
*Examiners.*